United States Patent [19]
Smyk et al.

[11] 3,975,314
[45] Aug. 17, 1976

[54] STANNOUS SALT CATALYZED EPOXY SYSTEMS
[75] Inventors: Rostyslaw R. Smyk, Chicago; Rafat T. Rabi, Villa Park, both of Ill.
[73] Assignee: DeSoto, Inc., Des Plaines, Ill.
[22] Filed: Oct. 10, 1974
[21] Appl. No.: 511,393

[52] U.S. Cl. ............................ 260/2 EP; 260/2 EA; 260/2 EC; 260/75 EP; 260/78.41
[51] Int. Cl.² .................. C08G 59/42; C08G 59/68
[58] Field of Search ............ 260/2 EA, 2 EP, 2 EC, 260/75 EP, 78.4 EP

[56] References Cited
UNITED STATES PATENTS

| | | | |
|---|---|---|---|
| 2,683,131 | 7/1954 | Cass | 260/75 EP |
| 2,962,524 | 11/1960 | Hostettler et al. | 260/75 EP |
| 3,405,102 | 10/1968 | Kugler et al. | 260/2 EC |
| 3,427,255 | 2/1969 | Case | 260/2 EA |
| 3,492,269 | 1/1970 | Janssen et al. | 260/2 EC |

FOREIGN PATENTS OR APPLICATIONS
47,878  2/1972  Japan ............................ 260/2 EA OTHER PUBLICATIONS
Condensed Chemical Dictionary, 5th Ed., Reinhold, N.Y., (1956), p. 941.

*Primary Examiner*—H.S. Cockeram
*Attorney, Agent, or Firm*—Dressler, Goldsmith, Clement & Gordon, Ltd.

[57] ABSTRACT

Epoxy resin-based coating systems of high solids content and possessing an extended working period are provided using a fluid mixture of cyclohexene oxide moiety-containing polyepoxide, in admixture with a carboxyl functional material, especially a resin, and a stannous salt such as stannous chloride as catalyst. These systems cure well on baking, even at low baking temperatures.

12 Claims, No Drawings

STANNOUS SALT CATALYZED EPOXY SYSTEMS

The present invention relates to low temperature curing epoxy resin-based coating systems of high solids content in which the mixture which is applied is relatively stable, providing an extended working period, but which cures rapidly at modest curing temperature in the form of a film when exposed to air.

Epoxy resin curing systems are known, these generally being two package systems which are mixed prior to application. However, those systems which cure rapidly at low temperature are also highly reactive upon mere admixture prior to application, and this greatly restricts the time available for application.

In accordance with this invention, a fluid mixture is formed of a cyclohexene oxide moiety-containing polyepoxide, which is preferably a diepoxide, a carboxyl functional material, preferably a resin, and a stannous salt, preferably stannous chloride, as catalyst. This mixture is slowly reactive and possesses an extended pot life. Upon coating the same upon a base, exposure to air converts the fluid mixture into a rapidly curing system which cures at baking temperatures as low as 220°F.

Various nonreactive organic solvents can be used to thin the fluid mixture and provide the desired low viscosity needed for coating application. Preferred solvents in this invention are ethers and hydroxy ethers such as 2-ethoxy ethanol, though ketones, such as methyl ethyl ketone, and esters, such as butyl acetate, are also useful.

Various carboxyl functional resins can be used so long as the other reactive functionality in the resin is limited to hydroxyl. Thus, copolymers of monoethylenic carboxylic acids such as acrylic acid, methacrylic acid, crotonic acid, itaconic acid, maleic acid, or fumaric acid, and their monoesters such as monobutyl fumarate, and the like, may be used. The balance of the copolymer is of secondary significance so long as the copolymer is organic solvent soluble. Styrene, vinyl toluene, methyl methacrylate, vinyl acetate, ethyl acrylate, n- or isobutyl acrylate, octyl methacrylate, and the like, will illustrate the copolymerizable monoethylenic monomers which constitute the balance of the copolymer, though any copolymerizable ethylenic material can be used which does not destroy the solvent solubility. Hydroxy functionality may be brought in using hydroxy ethyl acrylate or hydroxy propyl methacrylate, or by monoepoxide reacted with part of the acid in the copolymer.

Conventional polyester resins are also useful, these preferably being saturated polyesters, oil-modified or not as desired, having the desired acidity.

It is permissible for the polyester to be formed in situ during the low temperature bake. Thus, a resinous polyol may be used in admixture with a polycarboxylic acid anhydride, such as phthalic anhydride or trimellitic anhydride. Preferably, the anhydride is liquid or melts below about 60°C. such as dodecenyl succinic anhydride (liquid), or hexahydrophthalic anhydride (which melts below 60°C.).

While carboxyl functional resins are primarily contemplated, it is possible to replace these with monocarboxylic acids of low volatility as suggested by U.S. Pat. No. 2,999,827, though this is less preferred.

As is common in the art, words are used to speak positively. When a polyol is referred to, a plurality of alcoholic hydroxy groups is defined. Since no other reactive group is noted, none is present. Correspondingly, a polycarboxylic anhydride does not include any reactive group other than the carboxyl group or its anhydride.

Resinous polyols are illustrated by copolymers of styrene and allyl alcohol, copolymers of hydroxy ethyl acrylate, polyethers having two or more hydroxy groups, such as polyethylene glycol or an ethylene oxide adduct of trimethylol propane or pentaerythritol, and lactone, adducts of polyhydric alcohols, again illustrated by trimethylol propane or pentaerythritol.

The polyepoxide to carboxyl functional resin ratio (equivalents of oxirane or equivalents of carboxyl) may vary widely from about 0.5:1 to 20:1. The higher the weight proportion of polyepoxide, the higher the acid number needed in the carboxyl functional resin. Normally, the ratio will not exceed about 10:1.

Using an aliphatic diepoxide as the major film forming resin, the carboxyl-containing resin desirably has an acid number in the range of 80–300, preferably 100–200, and the weight ratio should be from 1–6 parts of diepoxide per part of carboxyl resin, preferably 1–3.

Similarly, when the carboxyl resin is the major film former, the equivalent ratio of oxirane to carboxyl may range from 0.5:1 to 2:1, preferably from 1:1 to 1.5:1.

While these illustrate preferred systems, the invention does not require these proportions.

The use of stannous salt, preferably the halide, and especially the chloride, is critical in the present invention. It would appear that the stannous salt is oxidized to the stannic form on air exposure. This provides a stable system prior to coating since it is only after exposure to air that the rapid curing reaction takes place. The stannous salt, such as the chloride, may be used in its anhydrous form, or as a hydrate, but proportions are based on the weight of the stannous salt, and any water present is ignored.

While stannous chloride is particularly preferred because it is readily available, inexpensive, oxidizes rapidly, and exerts a strong catalytic effect in the oxidized form, other stannous salts are also useful, such as the other halides illustrated by the bromide and the iodide. The inorganic salts, including the halides noted above, and other inorganic salts, such as the phosphite or the sulfate, are preferred over the organic salts, illustrated by stannous octoate. Even the least preferred organic stannous salts are effective, e.g., stannous octoate, while less preferred, is fully effective when higher baking temperatures are employed.

Broadly, one may use from 0.1 – 2.0% of stannous salt, based on the weight of the resins subjected to cure. Preferred proportions are from 0.25 – 1.2%.

When the polyepoxide to carboxyl resin weight ratio is in the range of 1–6, then it is preferred to employ from 0.2–1.0% of stannous chloride. When the carboxyl resin is the major film former, then smaller amounts of catalyst also give preferred results, namely 0.1 – 1.0%.

The polyepoxides which are used herein should contain the cyclohexene oxide moiety. While diepoxides are particularly contemplated, mixtures with monoepoxides are also useful so that the polyfunctionality of the polyepoxide can be defined as having a 1,2-epoxy equivalency of at least 1.2, preferably at least 1.4. The epoxides contemplated contain only oxirane and, optionally, hydroxy functionality. Various polyepoxides containing the cyclohexene oxide moiety are known, and these are abundantly illustrated in the patent literature, reference being made to U.S. Pats. Nos. 2,890,194; 2,890,195; 2,890,196; 2,890,197; 2,890,210, 3,023,174; and 3,027,357. Particularly preferred cyclohexene diepoxides are 3,4-epoxycyclohexylmethyl-3,4-epoxycyclohexane carboxylate and bis(3,4-epoxy-6-methylcyclohexylmethyl)adipate.

The two diepoxides noted above are available in commerce. The first is available from Union Carbide (ERL-4221), or Ciba-Geigy (CY-179), and the second from Union Carbide (ERL-4289), or Ciba-Geigy (CY-178). The structural formula for these compounds is as follows:

Diepoxide No. 1

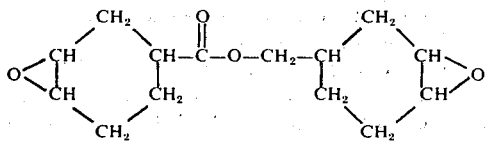

Diepoxide No. 2

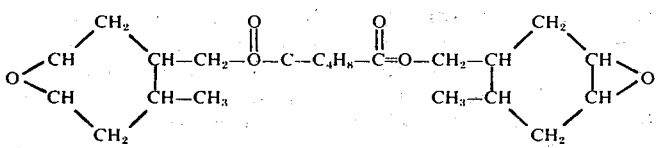

The ether solvents are particularly preferred for thinning the fluid mixtures of this invention. These are illustrated by glycol ethers, such as 2-ethoxy ethanol and 2-butoxy ethanol. The ethers may be hydroxy functional, but they need not be hydroxy functional, as in the compound 1,2-dimethoxyethane.

Very little solvent is needed in preferred systems, e.g., from 5–25% of the weight of the mixture. At least 1% of nonreactive solvent is preferably present to assist in increasing the pot life of the catalyzed system. These systems are quite stable and the viscosity remains relatively constant for many hours. Despite this, coatings cure in air at temperatures of from 220°F, – 325°F. for from 2 – 20 minutes, as will be illustrated hereinafter.

The systems of this invention are conveniently formulated as two package systems. The first package contains the carboxyl-containing resin, the catalyst, and the solvent. The second package contains the polyepoxide. Pigments, dyes, waxes, flow control agents, and the like may be present in either of the packages. The two packages are simply mixed prior to use, there being ample time for mixing and storage prior to application.

The invention is illustrated in the following examples.

EXAMPLE 1

Carboxylated Prepolymer

A carboxyl-containing prepolymer of acid value 158 was prepared by the condensation of one mole of polyoxyethylene glycol of average molecular weight of 400 (Carbowax 400 of Union Carbide may be used) with two moles of hexahydrophthalic anhydride.

| Formulation (Parts by Weight) | |
|---|---|
| Epoxide No. 1 | 84 |
| Carboxyl-Containing Prepolymer | 53 |
| $SnCl_2.2H_2O$ | 1 |
| Dimethoxy ethane | 12 |
| 2-Ethoxy ethanol | 3 |
| | 153 parts |

| Parameters and Properties of Formulation | |
|---|---|
| Oxirane to carboxyl ratio | 4 |
| Percent catalyst | about 0.75% on solids |
| Percent solids | 90% |
| Initial viscosity | about 400 centipoises |
| Viscosity after 6 hours | about 600 centipoises |

Cure Cycles and Cured Film Properties

On curing in three different ways: (1) for 20 minutes at 220°F; (2) for 10 minutes at 250°F; and (3) for 5 minutes at 300°F., each of the films exhibited a 2H pencil hardness, passed 60 in. -lbs. reverse impact, and passed 100 double rubs with a cloth saturated with methyl ethyl ketone.

Without the stannous chloride, the films were viscous liquids after any one of the above curing cycles.

The films referred to above and in the remaining examples were made by drawing down the formulation on aluminum panels with a No. 18 wire wound rod.

EXAMPLE 2

Carboxylated Prepolymer

A carboxyl-containing prepolymer of acid value 133 was prepared by the condensation of one mole of a caprolactone triol having an average molecular weight of 540, a melting range of from 15°–20°C., an hydroxyl number of 0.3, and a viscosity of 470 centistokes measured at 40°C. (NIAX Caprolactone Polyol PCP-0300 supplied by Union Carbide Corp. may be used), with 1.69 moles of hexahydrophthalic anhydride and 0.56 mole of dodecenyl succinic anhydride. The molar ratio of the anhydrides is 3:1 with an overall average of 2.25 hydroxyl groups on the triol esterified.

| Formulation (Parts) | |
|---|---|
| Epoxide No. 2 | 42.0 |
| Epoxide No. 1 | 42.0 |
| Carboxylated prepolymer | 64.0 |
| $SnCl_2.2H_2O$ | 1.5 |
| 2-Methoxy ethanol | 37.5 |
| | 187.0 |

| Parameters and Properties of Formulation | |
|---|---|
| Oxirane to carboxyl ratio | 4 |
| Percent catalyst | about 1.0% on solids |
| Percent solids | 80% |
| Initial viscosity | 190 centipoises |
| Viscosity after 8 hours | 310 centipoises |

Cure Cycles and Cured Film Properties

On curing (1) for 20 minutes at 250°F.; and (2) for 5 minutes at 300°F., each of the films exhibited a 2H pencil hardness, passed 60 in.-lbs. reverse impact, and passed 20 double methyl ethyl ketone rubs.

Without the stannous chloride, the films were viscous liquids after either of the above cure cycles.

EXAMPLE 3

A carboxylated resin of acid value 202 (on solids) was prepared by half esterification of a low molecular weight heteropolymer of styrene and maleic anhydride (SMA 1000A of ARCO may be used) with an excess of 2-methoxy ethanol to yield a final solids content of 50%.

| Formulations (parts) | 3-A | 3-B |
|---|---|---|
| Epoxide No. 2 | 105 | — |
| Epoxide No. 1 | — | 70 |
| Carboxylated resin (50% solids) | 70 | 70 |
| SnCl$_2$.2H$_2$O | 1.4 | 1 |
| 2-methoxy ethanol | 25.6 | 10 |
|  | 202.0 | 151 |
| Parameters and Properties of Formulations | 3-A | 3-B |
| Oxirane to carboxyl ratio | 4 | 4 |
| Percent catalyst | 1.0 | 1.0 |
| Percent solids | 70 | 70 |
| Initial viscosity (centipoise) | 90 | 120 |
| Viscosity after 8 hours (centipoise) | 150 | 310 |

Cure Cycles and Cured Film Properties

Formulation 3-A

| | |
|---|---|
| 20 minutes at 220°F. | Cured films exhibited an F pencil hardness; |
| 10 minutes at 250°F. | passed 60 in.-lbs. reverse impact and |
| 2 minutes at 300°F. | 10 double methyl ethyl ketone rubs. |
| 20 minutes at 250°F. | Cured films exhibited an H pencil hardness; |
| 10 minutes at 300°F. | passed 60 in.-lbs. reverse impact and 20 double methyl ethyl ketone rubs. |
| 20 minutes at 300°F. | Cured films exhibited a 2H pencil hardness; passed 60 in.-lbs. reverse impact and 100 double methyl ethyl ketone rubs. |

Without the stannous chloride, the films were tacky after any one of the above cure cycles, except after the 20 minute bake at 300°F. After the latter bake, the film was tack-free, but less than B pencil hardness, with no methyl ethyl ketone resistance (failed 2 double methyl ethyl ketone rubs).

Formulation 3-B

| | |
|---|---|
| 20 minutes at 220°F. | Cured films exhibited a 2H pencil hardness |
| 10 minutes at 250°F. | and passed 100 double methyl ethyl ketone |
| 5 minutes at 300°F. | rubs, but the films were brittle |

Without the stannous chloride, the film after 20 minutes at 250°F. was F pencil hardness, but with no methyl ethyl ketone resistance (failed 2 double rubs).

EXAMPLE 4

Carboset 525 (B.F. Goodrich), a commercial polyacrylate containing carboxyl groups, was dissolved as a 30% solids solution in a 50:50 mixture of 2-methoxy ethanol:methyl ethyl ketone. The acid value of the Carboset 525 was determined to be 88 on solids.

| Formulation (Parts) | |
|---|---|
| Epoxide No. 2 | 21.0 |
| Carboxylated Prepolymer | 106.3 |
| SnCl$_2$.2H$_2$O | 0.5 |
| 2-Methoxy ethanol | 50.2 |
|  | 178.0 |
| Parameters and Properties of Formulations | |
| Oxirane to carboxyl ratio | 2 |
| Percent catalyst | about 1.0% |
| Percent solids | 30% |
| Initial viscosity | 180 centipoises |
| Viscosity after 6 hours | 350 centipoises |
| Cure Cycles and Cured Film Properties | |
| 20 minutes at 220°F. | |
| 5 minutes at 250°F. | |
| 2 minutes at 300°F. | |

The cured films exhibited a 2H pencil hardness, and passed 60 in.-lbs. reverse impact.

Without the stannous chloride after a bake of 20 minutes at 250°F., the films were still tacky.

EXAMPLE 5

Carboxylated Prepolymer

A carboxyl containing prepolymer of acid value 153 was prepared by the condensation of one mole of a polypropylene glycol (diol) having an average molecular weight of 425 (PPG-425 supplied by Union Carbide Corp. may be used) with 2 moles of hexahydrophthalic anhydride.

| Formulation (Parts by Weight) | |
|---|---|
| Epoxide No. 1 | 210 parts |
| Carboxylated prepolymer | 70 parts |
| SnCl$_2$.2H$_2$O | 0.7 part |
| 2-Methoxyethanol | 50 parts |
| Parameters and Properties of Formulation | |
| Oxirane to Carboxyl Ratio | 8 |
| Percent Catalyst | 0.25% |
| Percent solids | 85% |
| Initial Viscosity | about 60 centipoises |
| Viscosity after 8 hours | about 85 centipoises |

Cure Cycle and Cured Film Properties 10 minutes at 325°F, vs. usual bake of 10 minutes at 400°F. for the conventional systems now in use and which require a much larger proportion of solvent.

The cured films exhibited a 4H pencil hardness, passed 60 inch pounds reverse impact, and passed 90 double methyl ethyl ketone rubs. Without the stannous chloride, the films were still tacky.

The invention is defined in the claims which follow.

We claim:

1. A rapid curing oxidizable epoxy resin-based coating composition of high solids content and possessing an extended working period comprising consisting essentially of a fluid mixture of a cyclohexene oxide moiety containing polyepoxide component having a 1,2 epoxy equivalency of at least 1.2, a carboxyl functional material reactive with said polyepoxide to cure the same, from 5–25% by weight of nonreactive organic solvent, and from 0.1–2.0% of stannous chloride as catalyst, based on the total weight of materials subjected to cure, the ratio of polyepoxide component to carboxyl functional material providing a ratio of equivalents of oxirane to equivalents of carboxyl of from about 0.5:1 to 20:1.

2. A coating composition as recited in claim 1 in which said polyepoxide is a diepoxide.

3. A coating composition as recited in claim 1 in which said carboxyl functional material is a resin selected from copolymers of monoethylenic carboxylic acids, polyesters, and mixtures of resinous polyol and polycarboxylic acid anhydride.

4. A coating composition as recited in claim 1 in which said carboxyl functional material is constituted by a mixture of a resinous polyol and a polycarboxylic acid anhydride.

5. A coating composition as recited in claim 4 in which said anhydride melts below about 60°C.

6. A coating composition as recited in claim 1 in which said polyepoxide carries two cyclohexene epoxide groups, there being from 1–6 parts of diepoxide per part of the carboxyl material, and said carboxyl functional material has an acid number in the range of 80–300.

7. A coating composition as recited in claim 6 in which said stannous chloride is present in an amount of from 0.2 – 1.0%.

8. A coating composition as recited in claim 1 in which said carboxyl functional material is a resin and is the major film forming resin, the equivalent ratio of oxirane to carboxyl being from 0.5:1 to 2:1.

9. A coating composition as recited in claim 8 in which said stannous chloride is present in an amount of from 0.1 – 1.0%.

10. A coating composition as recited in claim 1 in which said solvent is mainly constituted by an ether.

11. A coating composition as recited in claim 10 in which said ether is dimethoxy ethane.

12. A rapid curing oxidizable epoxy resin-based coating composition of high solids content and possessing an extended working period comprising a fluid mixture comprising consisting essentially of from 1–6 parts of diepoxide having two cyclohexene epoxide groups, one part of a carboxyl functional resin having an acid number in the range of 80–300 and reactive with said diepoxide to cure the same, from 5–25% of the weight of the mixture of nonreactive solvent, and from 0.1–2% of stannous chloride as catalyst, based on the total weight of materials subjected to cure, the ratio of equivalents of oxirane to equivalents of carboxyl being from about 0.5:1 to 20:1.

* * * * *

UNITED STATES PATENT OFFICE
CERTIFICATE OF CORRECTION

PATENT NO. : 3,975,314
DATED : August 17, 1976
INVENTOR(S) : Rostyslaw R. Smyk and Rafat T. Rabi It is certified that error appears in the above-identified patent and that said Letters Patent are hereby corrected as shown below:

Col. 2, line 11, the comma (,) between "lactone" and "adducts" should be deleted.

Col. 2, line 14, "or" should read --to--

Col. 3, in the formula for Diepoxide No. 2, at the extreme left of the formula, a bond should be included to close the ring:

Claim 1, line 3 of the claim, "comprising" should be deleted.

Claim 12, line 4 of the claim "comprising" should be deleted.

Signed and Sealed this

Eighteenth Day of October 1977

[SEAL]

Attest:

RUTH C. MASON
Attesting Officer

LUTRELLE F. PARKER
Acting Commissioner of Patents and Trademar